Oct. 26, 1948.    W. A. ZENTIS    2,452,417
METHOD AND APPARATUS FOR USE IN DESIGNING SOLAR HOUSES
Filed Dec. 13, 1946    2 Sheets-Sheet 1
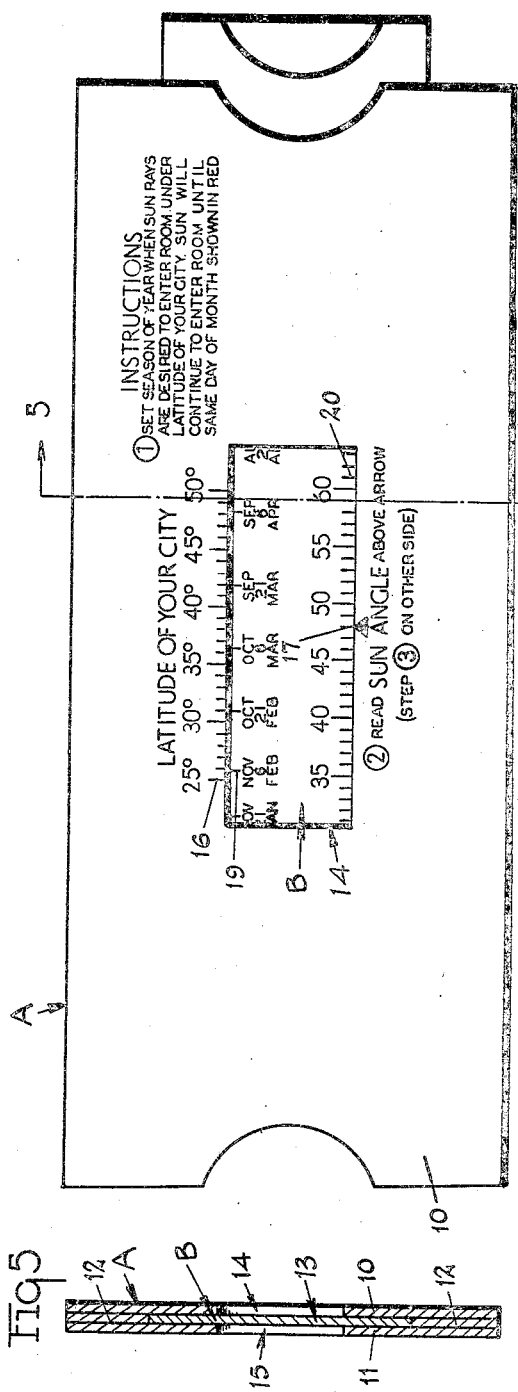
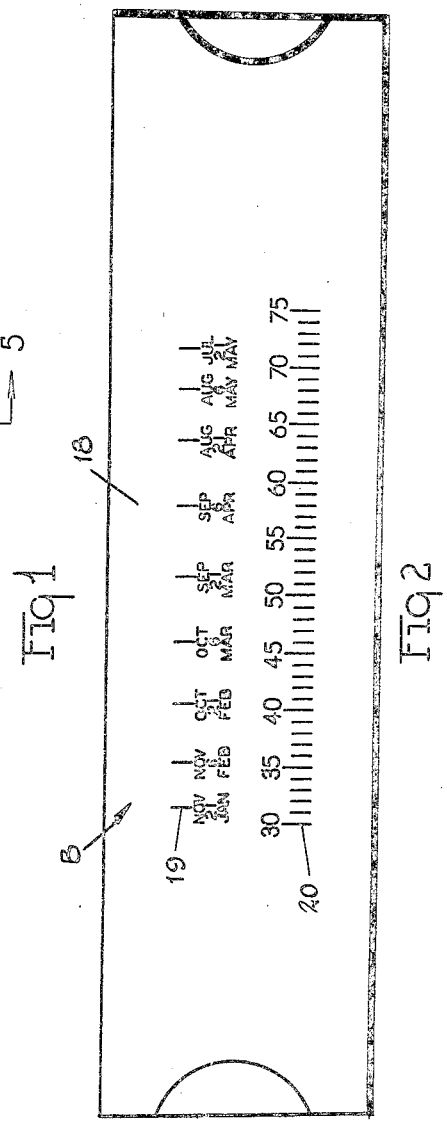
INVENTOR.
William A. Zentis
BY Nobbe & Swope
ATTORNEYS

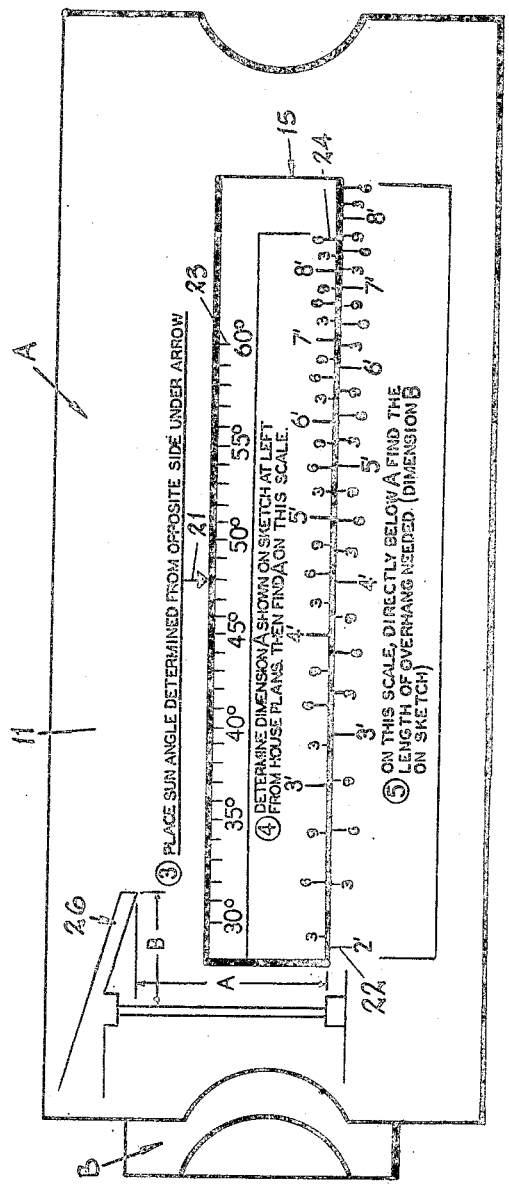
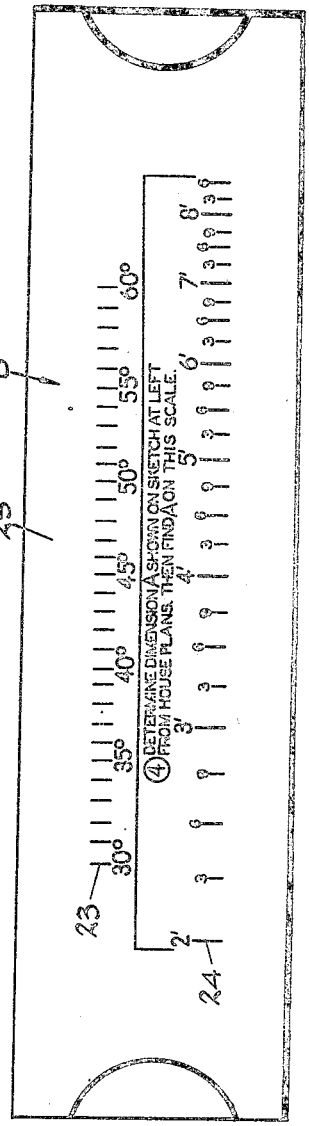
Fig 3
Fig 4

Patented Oct. 26, 1948

2,452,417

UNITED STATES PATENT OFFICE 2,452,417

METHOD AND APPARATUS FOR USE IN DESIGNING SOLAR HOUSES

William A. Zentis, Chicago, Ill., assignor to Libbey-Owens-Ford Glass Company, Toledo, Ohio, a corporation of Ohio Application December 13, 1946, Serial No. 715,920

3 Claims. (Cl. 235—70)

The present invention relates broadly to so-called "solar houses;" and more particularly to a novel method and apparatus designed to calculate the length of roof overhang, or extension, necessary for efficient construction in such houses.

Briefly stated, a solar house is one that is designed and oriented to take advantage of solar radiation as an auxiliary source of heat. This is accomplished primarily by facing the living quarters toward the south and by the use of transparent walls or unusually large window areas in the walls on the southern exposure of the house. In this way a maximum amount of the radiant energy of the winter sun, when it swings low on southern horizons, is allowed to enter and warm the home.

As a corollary to this, however, it is necessary to use overhanging roof constructions on the south side of such "solar houses," in order to provide a visor which will keep out the direct rays of the sun when it is riding higher in the heavens during the summer months, and when the entry of additional heat into the house is not desired.

The required width of such an eave, overhang or sun visor will, of course, vary in different sections of the country and, in deciding on the width of brim or overhang that will be necessary to admit direct sunlight only during certain predetermined months of the year, the angles of the sun's rays due to the varying altitude of the sun resulting from latitude and season, as well as the height of window opening, must all be considered. Consequently, the seemingly simple step of determining the width of the southern eaves on a "solar house" has heretofore involved some complicated calculations.

For example, one of the simplest procedures was to find the angle of the sun at the latitude of the building site for the season of year when it was desired to have the sun's rays enter into the room through the southern windows. This sun angle was found by subtracting the degrees north latitude of the building site from a list of figures based on the declination of the earth's axis to the perpendicular of its elliptical plane at the various seasons of the year, which list was obtainable from the Chicago planetarium.

After the sun angle had been determined in this manner it was plotted on a house plan drawn to scale, and the required length of roof overhang was then found by measurement on the house plan. Even this short cut method required special drawings, and was somewhat confusing to those unfamiliar with the earth's motion around the sun.

Now, it is an aim of this invention to provide a new, improved and simplified way of determining the correct width of overhang on the southerly exposed walls of "solar houses" in any location, and with any sized window openings, so that the direct rays of the sun will be admitted through the window openings during any desired period of the year and be excluded during the balance of the year.

Another object is the provision of a calculating device which, by simple manipulation, will calculate the size of overhang for a given set of conditions of location, time and window size.

Another object is to provide a slide rule type of calculating device which, from a given location and a given season or mid-season of the year, will calculate the sun's angle above the horizon for the season or mid-season given.

Another object is the provision of a calculating device of the above character which, from a given sun angle representing a predetermined season or mid-season of the year and a given window height, will calculate the length of overhang necessary with the given window height to exclude the direct rays of the sun except during the season or mid-season represented by the sun angle given.

Other objects and advantages of the invention will become more apparent during the course of the following description, when taken in connection with the accompanying drawings.

In the drawings, wherein like numerals are employed to designate like parts throughout the same:

Fig. 1 is a side elevation of the sun angle and overhang calculating device of the invention, showing the slide pulled out slightly to the left;

Fig. 2 is a view of the slide removed from the device and facing in the same direction as in Fig. 1;

Fig. 3 is a view of the opposite side of the calculating device shown in Fig. 1;

Fig. 4 is a view similar to Fig. 2 but with the slide facing in the same direction as in Fig. 3; and Fig. 5 is a section taken substantially along the line 5—5 in Fig. 1.

As indicated above, the calculating device of this invention is of the slide rule type. That is, it comprises, in its preferred form, a fixed base or guide portion and a sliding portion operating within the fixed portion. Each of the portions or pieces of the device is provided with a complementary, registering scale, or scales, on one or both faces which are so arranged and graduated that some function of a marking on one piece is formed opposite it on the other piece.

To illustrate, the embodiment of the invention disclosed in the drawings is designed to calculate the roof overhang necessary for the southern exposure of a "solar house" to be located anywhere in the continental United States or southern Canada and having any height windows up to eight feet six inches.

As shown, the calculating device comprises a fixed base, body or guide portion A, and a slide B operable within the fixed portion. The body portion A, which may be of wood, heavy paper or other suitable material, includes opposite side walls 10 and 11 spaced from each other by the spacers 12 to form a medial guideway 13 for the slide B. One relatively simple method of making the fixed portion A of the device is to use separate sheets of material for the walls 10 and 11 and the spacers 12 and, after arranging them in their respective positions, to laminate them all together.

Suitable scales or markings, designed to produce the desired results upon relative movement between the fixed piece A and the sliding piece B of the device, are applied to both faces of both the fixed and the sliding pieces and positioned so that the markings on one piece can be brought into registry with the cooperating markings on the other piece. The side walls 10 and 11 are provided with windows 14 and 15 so as to expose the movable scale on the slide B to view.

As has already been explained, the purpose of the calculator is (1) to simplify the determination of the sun's angle above the horizon for any season or mid-season of the year for any location within the range of the instrument; and (2) to utilize this angle, and by means of cooperating scales read directly thereon the required roof overhang or extension for any height window.

To this end, graduated markings 16, representing the degrees of latitude between 25 and 50 degrees, are engraved or otherwise placed on the face of the wall 10 of the fixed portion A across and immediately adjacent the top of the window 14. Also, on the face of the wall 10, just below and midway the opposite ends of the window 14, is placed an arrow or similar indicating device 17.

To complete the markings necessary for the determination of the sun's angle, the face 18 of the slide B is provided with two lines of graduated markings 19 and 20 as shown in Fig. 2, and which are positioned to be brought into direct registry with the marks 16 and 17 above and below the window 14 on the face of the side wall 10 of the fixed portion of the device. The upper set of graduated markings 19 on the face 18 of the slide represent seasons or mid-seasons of the year, while those on the lower line 20 designate, in degrees, the sun's angle above the horizon.

In constructing these scales for determining the sun's angle at the various seasons and mid-seasons of year, it is necessary to establish the proper varying distances between the markings representing the various seasons and mid-seasons in ratio to the declination of the earth's axis at the corresponding season and mid-season, and to arrange these scales so that the correct sun angle will be indicated when a selected season or mid-season is set to a certain fixed point.

Perhaps this can best be illustrated by explaining in detail how the scales are laid out on the particular form of calculator shown in the drawings. Thus, as pointed out above, the markings on side 10 of the fixed member and face 18 of the slide are for the purpose of determining the angle of the sun above the horizon at the time of year when it is desired to have the sun begin to enter the windows of a "solar house" that is to be built at a given location or latitude.

This sun angle can be determined from the side 10 of the calculator by using it to solve the equation: (90°—latitude+sun's declination=sun angle). This is true because if we subtract from an angle of 90°, representing the angle between a perpendicular line at the proposed building site and a line drawn in the direction of the horizon, the degrees of latitude representing the position of the building site, and then add the sun's declination at the given season of year, the result will be the sun's angle above the horizon at the building site at that season.

In marking the side 10 of the calculator for this purpose, the markings for the latitude on scale 18 may be made to any convenient scale, or arbitrary distances can be used between markings to give a convenient overall length. The scale 16 as used in the drawings represents minus degrees because it is to be used to subtract degrees of latitude from 90° for the reasons set forth above.

The next step is to place the pointer or indicator 17 and this is preferably located at the middle of the window 14, simply as a matter of convenience.

The third step is to place the seasonal markings on the scale 19 and these are made to represent semimonthly periods so that it will be possible to show under the same mark in every case the date when the sun will begin entering the window (top month) and the date when the sun will cease to enter the window (low month on scale). The mark for September 21 should be put on first at approximately the middle of the scale because this represents the zero point or, in other words, the date when the declination of the sun is practically zero. Additional marks are then placed to either side of the zero point on the scale to represent successive semimonthly periods.

The markings for these season and mid-season positions should be spaced from the zero position $$\begin{pmatrix} \text{SEP} \\ 21 \\ \text{MAR} \end{pmatrix}$$

at a distance from one another, in degrees, that is equal to the sun's declination for that time of year, using the same distance to represent each degree as was used on the scale 16.

Having placed semimonthly dates in the top and second lines along the scale 19 as outlined above, there is then placed in the third line of this scale below each date on the first and second lines, the month when the sun's declination on the month and day shown in the second and third lines will be substantially the same as the sun's declination on the month and day shown in the first and second lines at the same point. To illustrate, as noted the sun's declination on Sep. 21 is practically zero. It is also at about zero on March 21, so MAR is placed on the third line of scale 19 directly below $$\begin{matrix} \text{SEP} \\ 21 \end{matrix}$$

in the first and second lines.

With this set up, the upper month and the day beneath it will denote the date on which the sun may begin entering the windows while the associated lower month and the day above it will denote the date when the sun will stop entering the window. For ease in reading, the lower month may be printed in red (see legend (1) on the face of wall 10).

The fourth step is to arrange the numbers and markings on the scale 20, and these are laid out so that any figure on this scale that occurs over the pointer 17, with the slide B in any location will be the complement of the number on the scale 16 that, at the same time, lies over the zero declination point $$\begin{pmatrix} \text{SEP} \\ 21 \\ \text{MAR} \end{pmatrix}$$

on that scale. Thus, when the slide is in the position shown in Fig. 1, the number 48 is over the pointer 17, and the number 42 on the scale 16 lies over the zero point $$\begin{pmatrix} \text{SEP} \\ 21 \\ \text{MAR} \end{pmatrix}$$

on the scale 19. For all three scales 16, 19, and 20, the positive direction is to the right of zero and the negative is to the left.

Now, if the scales on this side of the calculator have been properly graduated and arranged, when the mark on the upper line 19, that corresponds to the date when it is first desired to have sunlight enter the southern rooms, is moved into registry with the one of the markings 16 that represents the latitude of the city in which the house is to be located, the arrow 17 will point to the mark on the scale 20 which indicates the angle of the sun above the horizon at that period.

This sun angle can then be used in conjunction with the cooperating scales on the opposite side of the device for determining the required roof overhang for any height of window up to eight and one-half feet. For this purpose, the face of the side wall 11 of the device carries an arrow or similar indicating device 21, just above and midway between the ends of the window 15; and carried upon the same wall just below and running from one side of the window to the other is a scale 22 marked off to designate window heights between two feet, and eight feet six inches.

Adapted to cooperate and register with the indicator 21 and the scale 22 respectively on the fixed portion of the device, are sets of upper and lower scales 23 and 24 on the face 25 of the slide B, as shown in Figs. 3 and 4. The upper scale 23 is marked to designate the previously determined sun angle and covers a range of degrees of angle similar to that on the sun angle scale 20 on the opposite face of the fixed portion of the device. The lower scale 24 is marked in a manner generally the same as that of scale 22 on the fixed member A but designates varying window heights between 2 feet and 8 feet 6 inches.

These scales for calculating the required length of the roof overhang are based on logarithmic graduations and are so aranged as to solve, by trigonometric function, the right triangle formed by the vertical window wall shown at 26, a horizontal line extending from the window wall to the extreme lowermost edge of the roof overhang and a diagonal line parallel to the sun angle and forming hypothenuse of the right triangle. By coordinating the logarithmic scales with the scale indicating the various sun angles, it is possible to automatically solve any triangle formed by varying sun angles, adjacent side and opposite side.

As was the case with the other side of the device, it is believed that the above will be more readily understood by outlining exactly how the various markings on this side are laid out. In the first place, the pointer 21 is preferably placed at the middle of the window 15, since this is the most convenient position. The next step is to place a mark on the scale 23 to represent the sun angle whose cotangent is 1 and whose log cotangent is zero. That is the sun angle of 45°. This should be located at the middle of the slide B, also as a matter of convenience. The rest of the markings on the scale 23 are then laid out from that point. In doing this, the distances of each angle both ways from 45° is made proportional to the log cotangent of that angle. The proportionality constant being so chosen that the desired range of sun angles will extend over a convenient length of the available space on the scale.

The next step is to lay out the markings representing feet and inches on the lower slide scale, and these markings are spaced at distances from an arbitrary point, established at the left of the contemplated location of the scale, which are proportional to the logarithm of the distance indicated in feet by the numbers over the markings. The proportionality constant used here must be the same as for the other scale 23 on the slide.

To then set up the markings for the lower fixed scale 22, the same markings are used as on the scale 24 and the markings on the scale 22 is so positioned, relative to the markings on the scale 24 as to correspond exactly therewith when the 45° mark on the scale 23 is opposite the indicator 21.

This completes the markings necessary to the operation of the sun angle and roof overhang calculator shown in the drawings. However, in order to facilitate use of the device for its intended purpose, suitable legends marked (1) and (2) respectively are preferably printed at appropriate locations on the face of the side wall 10 of the fixed portion, while other appropriate legends marked (3), (4) and (5) are printed on either the face of the side wall 11 of the fixed portion or on the corresponding face of the slide B as shown in Fig. 3.

Also printed on the face of the side wall 11 of the fixed portion A is a schematic showing 26 of a window wall with roof overhang and which carries a dimension A, indicating the height of the window for the proposed house from its bottom to a horizontal line extending from the window to the extreme lowermost edge of the roof overhang; and a dimension B representing the distance from the window wall to the outermost edge of the roof overhang.

The operation of the calculating device is set forth in the proper sequence of steps below and coincides with the legends (1) to (5) appearing on the device. For example, to determine the necessary amount of overhang for a roof above a south window having a seven foot effective height in a house to be located in Chicago, the procedure would be as follows:

Having determined the latitude of the city (Chicago is approximately 42 degrees north latitude) and the date when it is desired to have the sun begin to enter the room (September 21st is about right for that location) the device should be faced toward the operator as shown in Fig. 1, and he is then ready to proceed.

The first step is to move the slide B outwardly to the right until the vertical mark above $$\begin{matrix} \text{SEP} \\ 21 \\ \text{MAR} \end{matrix}$$

on the scale 19 is in alignment with the mark representing 42 degrees on the scale 16 (as shown in Fig. 1). When this has been done the operator will, as his second step, read the sun angle which appears on the scale 20 directly above the arrow 17. In this case the sun angle is 48 degrees.

The third step is to transfer the sun angle, obtained as described above, to the opposite side of the rule. This is done by turning the device over so that it faces the operator in the manner shown in Fig. 3. Now the slide B is moved out to the left until the mark representing the sun angle of 48 degrees on the scale 23 is directly below the arrow 21 (position shown in Fig. 3). Following this, the fourth step is to locate the dimension A from the diagram 26, and which represents the effective height of the window, on the scale 24, and to then read the figure on scale 22 that falls directly below that point. This gives the length of roof overhang required.

In the present case the effective window height was given as seven feet and reading on scale 22 directly below the designation for seven feet on scale 24 the operator will find that a roof overhang of just slightly more than six feet three inches is required.

The required roof overhang for houses to be built in cities located at other degrees of north latitude, and having different effective window heights can of course be determined in the same manner with the device and by the procedure outlined above.

Moreover, other instruments can be constructed along similar lines, and following the general principle of the invention, which will be capable of determining roof overhang for other degrees of north latitude and for varying degrees of south latitude. In fact, it is to be understood that, while the form of the invention herewith shown and described is to be taken as the preferred embodiment of the same, various changes in the size, shape and arrangement of parts may be resorted to without departing from the spirit of the invention or the scope of the subjoined claims.

For example, the invention may be embodied in devices of circular or other shapes and form; and, for the purpose of locating the markings, either one of the members A and B can be considered as the "fixed" member and the other as the "sliding" member.

Another possible modification would be to alter side 10 of the device shown in the drawings by placing the indicator 17 at the top of the sliding member B in place of the season markings, putting the season markings at the bottom instead of at the top of the slide B, and putting the sun angle scale 20 below the window 14 in place of the indicator 17.

With this arrangement either the sun angle scale and the season scale would have to be reversed. Or, the latitude scale might be reversed. That is, made to read from right to left instead of from left to right. The best way is to reverse the latitude scale.

The advantage of this modified arrangement would be that once the selected latitude was located at the indicator 17, the different seasons and their corresponding sun angles could be read without any further movement of the slide B.

I claim:

1. In a slide rule type calculating device, a fixed member and a sliding member, means on one part of said fixed member and on one part of said sliding member for determining the sun angle for a given latitude at a given season comprising, markings on said fixed member designating degrees of latitude, an indicating device also on said fixed member, markings on said sliding member designating seasons of the year and positioned to register with the said markings on the fixed member, and other markings on said sliding member designating degrees of sun angle positioned to register with said indicating device on the fixed member, the lines of each of said sets of markings being spaced to establish the various seasons in ratio to the declination of the earth's axis at the corresponding seasons of the year and arranged relative to the other markings to indicate the correct sun angle when a selected season marking is set at a fixed point.

2. In a slide rule type calculating device, a fixed member and a sliding member, and means on one part of said fixed member and on one part of said sliding member for calculating the required length of roof overhang for the southern exposure of a "solar house" from a given effective window height and a given sun angle comprising, an indicating device on said fixed portion, markings designating various lengths of overhang also on said fixed portion, markings on said sliding portion designating degrees of sun angle and positioned to register with the indicating device, and other markings on said sliding portion designating various effective window heights and positioned to register with the marking on the fixed portion designating overhang lengths; said markings for calculating the required length of roof overhang being based on logarithmic graduations arranged to solve by trigonometric function the right triangle formed by a vertical line equal in length to the effective window height desired, a horizontal line extending from the window to the lowermost edge of the desired roof overhang, and a diagonal line parallel to the sun angle and forming the hypotenuse of said right triangle.

3. In a slide rule type calculating device for determining the required length of roof overhang on a "solar house;" a fixed member and a sliding member, means on one part of said fixed member and on one part of said sliding member for determining the sun angle for a given latitude at a given season comprising, markings on said fixed member designating degrees of latitude, an indicating device also on said fixed member, markings on said sliding member designating seasons of the year and positioned to register with the said markings on the fixed member designating degrees of latitude, and other markings on said sliding member designating degrees of sun angle positioned to register with said indicating device on the fixed member, the lines of each of said sets of markings being spaced to establish the various seasons in ratio to the declination of the earth's axis at the corresponding seasons of the year and arranged relative to the other markings to indicate the correct sun angle when a selected season marking is set at a fixed point; and means on another part of said fixed member and on another part of said sliding member for calculating the required length of roof overhang from a given effective window height and the sun angle indicated by the first mentioned means comprising, a second indicating device on said fixed portion, markings designating various lengths of overhang also on said fixed portion, markings on said sliding portion designating degrees of sun angle and positioned to register with the second-mentioned indicating device, and other markings on said sliding portion designating various effective window heights and positioned to register with the markings on the fixed portion designating overhang lengths, said markings for calculating the required length of roof overhang being based on logarithmic graduations arranged to solve by trigonometric function the right triangle formed by a vertical line equal in length to the effective window height desired, a horizontal line extending from the window to the lowermost edge of the desired roof overhang, and a diagonal line parallel to the sun angle and forming the hypothenuse of the right triangle.

WILLIAM A. ZENTIS.

REFERENCES CITED

The following references are of record in the file of this patent:

FOREIGN PATENTS

| Number | Country | Date |
|---|---|---|
| 210,162 | Great Britain | Jan. 28, 1924 |